(12) United States Patent
Sharma et al.

(10) Patent No.: US 7,462,670 B2
(45) Date of Patent: Dec. 9, 2008

(54) SCRATCH RESISTANT POLYMER COMPOSITIONS

(75) Inventors: Ashutosh Sharma, Wappingers Falls, NY (US); Peter Solera, Suffern, NY (US); Sarah Kaspers, Scarsdale, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 11/523,457

(22) Filed: Sep. 19, 2006

(65) Prior Publication Data

US 2007/0066726 A1 Mar. 22, 2007

Related U.S. Application Data

(60) Provisional application No. 60/719,358, filed on Sep. 22, 2005.

(51) Int. Cl.
*C08F 8/30* (2006.01)
*C08L 31/00* (2006.01)
*C08L 33/00* (2006.01)
*C08L 35/00* (2006.01)
*C08L 77/00* (2006.01)
*C08G 18/28* (2006.01)
*C08K 5/00* (2006.01)

(52) U.S. Cl. .................. 525/183; 524/210
(58) Field of Classification Search .............. 524/210; 525/183
See application file for complete search history.

(56) References Cited

U.S. PATENT DOCUMENTS

| | | | | |
|---|---|---|---|---|
| 5,122,570 A * | 6/1992 | Subramanian | .............. | 525/66 |
| 5,126,407 A * | 6/1992 | Subramanian | .............. | 525/179 |
| 5,380,774 A * | 1/1995 | Mulholland | .............. | 524/182 |
| 5,585,420 A | 12/1996 | Grasmeder et al. | .............. | 523/400 |
| 5,731,376 A | 3/1998 | Grasmeder | .............. | 524/451 |
| 5,973,070 A * | 10/1999 | Baann | .............. | 525/70 |
| 6,048,942 A | 4/2000 | Buehler et al. | .............. | 525/240 |
| 6,331,592 B1 * | 12/2001 | Wong | .............. | 525/71 |
| 6,497,337 B1 * | 12/2002 | Kehe | .............. | 220/378 |
| 2002/0002267 A1 * | 1/2002 | Long | .............. | 528/310 |
| 2002/0009564 A1 * | 1/2002 | Hall et al. | .............. | 428/35.7 |
| 2003/0004245 A1 | 1/2003 | Scheibelhoffer et al. | .... | 524/425 |
| 2004/0063824 A1 * | 4/2004 | Takagi et al. | .............. | 524/115 |
| 2005/0238814 A1 * | 10/2005 | Renken | .............. | 427/458 |
| 2005/0272855 A1 * | 12/2005 | Renken | .............. | 524/495 |

FOREIGN PATENT DOCUMENTS

| | | |
|---|---|---|
| JP | 2001261902 | 9/2001 |
| JP | 2002003692 | 1/2002 |
| JP | 2002338778 | 11/2002 |
| WO | 96/22328 | 7/1996 |
| WO | WO 03016388 A1 * | 2/2003 |
| WO | 2004/099303 | 11/2004 |

OTHER PUBLICATIONS

Polyolefins 2003, The International Conference on Polyolefins, Feb. 24-Feb. 26, 2003, Houston, TX, pp. 101-109.
English Language Abstract for JP 2002338778, Nov. 27, 2002.
English Language Abstract for JP 2002003692, Jan. 9, 2002.
English Language Abstract for JP 62072739, Apr. 3, 1987.
English Language Abstract for JP 63017947, Jan. 25, 1988.
CPChem Specialty Chemicals Data Sheet PA-18, Polyanhydride Resins, (2004).

\* cited by examiner

*Primary Examiner*—Mark Eashoo
*Assistant Examiner*—Angela C Scott
(74) *Attorney, Agent, or Firm*—Tyler A. Stevenson

(57) ABSTRACT

Polymer substrates, for example ABS, PBT, PVC, PET, nylon 6, nylon 6'6, ABS/PBT, PC/ABS or ionomers, are made scratch resistant by the incorporation therein of an additive combination of b) a carboxylic acid reagent functionalized olefin polymer or copolymer and c) a primary or secondary fatty acid amide. The present polymers exhibit good weatherability, scratch resistance, good processability, good mechanical strength, good gloss retention and are non-sticky. The carboxylic acid reagent functionalized olefin polymer is for example maleic anhydride grafted polypropylene or polyethylene, or is a reaction product of maleic anhydride and an alpha-olefin, or is a tallow alcohol ester of said maleic anhydride products. The fatty acid amide is for example oleyl palmitamide or stearyl erucamide.

9 Claims, No Drawings

SCRATCH RESISTANT POLYMER COMPOSITIONS

This application claims the benefit under 35 USC 119(e) of U.S. Provisional Application Ser. No. 60/719,358, filed Sep. 22, 2005, the disclosure of which is incorporated by reference.

The present invention is aimed at scratch resistant polymer compositions. The invention is also aimed at a method of imparting scratch resistance to polymer compositions by incorporating therein certain anti-scratch additives. The polymer compositions are for example nylon, ABS, polycarbonate, polyester, polyvinyl chloride or blends thereof. The molded parts are useful for example in automotive applications.

BACKGROUND

Long chain alcohol functionalized maleic anhydride grafted polypropylene is disclosed in Polyolefins 2003, The International Conference of Polyolefins, Feb. 24-Feb. 26, Houston, Tex., as a processing aid for polyolefins.

U.S. Pat. No. 6,048,942 discloses thermoplastic olefin compositions comprising mar resistance additives selected from polysiloxanes, metal stearates, saturated fatty acid amides and unsaturated fatty acid amides.

JP2002338778 teaches a graft copolymer compositions comprising fatty acid amides.

U.S. Pat. No. 5,731,376 discloses polypropylene block copolymer with improved scratch resistance by inclusion of a polyorganosiloxane. The compositions may further include a fatty acid amide.

U.S. Pat. No. 5,585,420 teaches scratch resistant polyolefin compositions comprising a plate like inorganic filler. The compositions may further comprise high rubber ethylene-propylene copolymers, fatty acid amides, polyorganosiloxanes or epoxy resins.

JP2002003692 discloses polypropylene resin comprising fatty acid amides.

JP62072739 is aimed at molded articles for automobile parts made by compounding a specific polyolefin with a rubbery substance and a specific amount of mica of a specific particle size. The polyolefin consists of a certain polypropylene and a polyolefin modified with an unsaturated carboxylic acid (anhydride), for example maleic anhydride.

JP 63017947 is aimed at scratch resistant propylene polymer compositions.

JP 2001261902 is aimed at polypropylene resin compositions useful as molding material for preparation of interior trims.

U.S. published app. No. 2003/0004245 teaches blends of polyolefin and a reaction product of polyolefin and an alpha, beta unsaturated carboxylic ester, acid or anhydride.

Polyanhydride resins are described in a CPChem Specialty Chemicals data sheet of 2004.

SUMMARY OF THE INVENTION

Disclosed are Polymer Compositions Comprising
a) a polymer substrate and
an amount effective to improve the scratch resistance of said polymer substrate of an additive combination of
b) a carboxylic acid reagent functionalized olefin polymer or copolymer and
c) a primary or secondary fatty acid amide,
with the proviso that the polymer substrate is not comprised solely of polyolefin or rubber modified polyolefin.

Also disclosed is a method for providing scratch resistance to a polymer substrate, which method comprises incorporating into said polymer
an effective amount of an additive combination of
b) a carboxylic acid reagent functionalized olefin polymer or copolymer and
c) a primary or secondary fatty acid amide,
with the proviso that the polymer substrate is not comprised solely of polyolefin or rubber modified polyolefin.

DETAILED DISCLOSURE

Polymer Substrate

Polyolefins and rubber modified polyolefins are as described in U.S. provisional application No. 60/699,176, filed Jul. 13, 2005, the contents of which are hereby incorporated by reference. Rubber modified polyolefins are also known as thermoplastic polylefins (TPO). TPO is disclosed for example in U.S. Pat. No. 6,048,942, incorporated herein by reference. Polyolefins and rubber modified polyolefins may not solely be the polymer substrate of the present compositions. Not excluded as polymer substrates are copolymers of polyolefins with other polymers or blends of polyolefins with other polymers as described below.

The polymer substrates to be provided anti-scratch properties are for example:

1. Polystyrene, poly(p-methylstyrene), poly(α-methylstyrene), high impact polystyrene.
2. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof.

Homopolymers and copolymers may have any stereostructure including syndiotactic, isotactic, hemi-isotactic or atactic. Stereoblock polymers are also included.

2a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

2b. Hydrogenated aromatic polymers derived from hydrogenation of polymers mentioned under 2.), especially including polycyclohexylethylene (PCHE) prepared by hydrogenating atactic polystyrene, often referred to as polyvinylcyclohexane (PVCH).

2c. Hydrogenated aromatic polymers derived from hydrogenation of polymers mentioned under 2a.).

3. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

4. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

5. Polymers derived from α,β-unsaturated acids and derivatives thereof such as polyacrylates and polymethacrylates; polymethyl methacrylates, polyacrylamides and polyacrylonitriles, impact-modified with butyl acrylate.

6. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

7. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

8. Homopolymers and copolymers of cyclic ethers such as polyalkylene glycols, polyethylene oxide, polypropylene oxide or copolymers thereof with bisglycidyl ethers.

9. Polyacetals such as polyoxymethylene and those polyoxymethylenes which contain ethylene oxide as a comonomer; polyacetals modified with thermoplastic polyurethanes, acrylates or MBS.

10. Polyphenylene oxides and sulfides, and mixtures of polyphenylene oxides with styrene polymers or polyamides.

11. Polyurethanes derived from hydroxyl-terminated polyethers, polyesters or polybutadienes on the one hand and aliphatic or aromatic polyisocyanates on the other, as well as precursors thereof.

12. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

13. Polyureas, polyimides, polyamide-imides, polyetherimids, polyesterimids, polyhydantoins and polybenzimidazoles.

14. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

15. Polycarbonates (PC) and polyester carbonates.

16. Polyketones.

17. Polysulfones, polyether sulfones and polyether ketones.

18. Crosslinked polymers derived from aldehydes on the one hand and phenols, ureas and melamines on the other hand, such as phenol/formaldehyde resins, urea/formaldehyde resins and melamine/formaldehyde resins.

19. Unsaturated polyester resins derived from copolyesters of saturated and unsaturated dicarboxylic acids with polyhydric alcohols and vinyl compounds as crosslinking agents, and also halogen-containing modifications thereof of low flammability.

20. Blends of the aforementioned polymers (polyblends), for example, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

21. Ethylene/alkyl acrylate copolymers, ethylene/alkyl methacrylate copolymers, ethylene/vinyl acetate copolymers or ethylene/acrylic acid copolymers and their salts (ionomers) and mixtures of such copolymers with others, for example LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

For instance, the present polymer substrates are acrylonitrile/butadiene/styrene copolymer (ABS), styrene/butadiene/styrene copolymer (SBS), styrene/acrylonitrile copolymer (SAN), acrylonitrile/styrene/acrylonitrile copolymer (ASA), polybutylene terephthalate (PBT), polyethylene terephthalate (PET), unsaturated polyester (UPES), polyamide (PA), thermoplastic urethane (TPU), polystyrene (PS), high impact polystyrene (HIPS), polycarbonate (PC), PC/ABS blend, ABS/PBT blend, polyvinyl chloride (PVC); PVC blends such as PVC/ABS, PVC/ASA or PVC/acrylate or ionomers.

For instance, the present polymer substrates are ABS, PBT, PVC, PET, nylon 6, nylon 6'6, ABS/PBT, PC/ABS or ionomers.

Carboxylic Acid Reagent Functionalized Olefin Polymer or Copolymer

The olefin polymers or copolymers of the functionalized olefin polymers or copolymers of component b) are for example polypropylene homo- and copolymers and polyethylene homo- and copolymers. For instance, polypropylene, high density polyethylene (HDPE), linear low density polyethylene (LLDPE), polypropylene random and impact (heterophasic) copolymers, propylene/ethylene copolymers or ethylene-alpha-olefin copolymers.

The functionalized olefin polymers or copolymers are for example as disclosed in U.S. app. 2003/0004245, published Jan. 2, 2003, based on U.S. application Ser. No. 10/041,056, filed Jan. 7, 2002, incorporated herein by reference.

The functionalized olefin polymers or copolymers are for example the reaction product of at least one polyolefin and at least one alpha, beta-unsaturated carboxylic acid reagent, such as an acid, ester or anhydride.

In one embodiment, the number average molecular weight of the polyolefins utilized in this component may range from about 2,000 to about 10,000. These polymers typically have a melt flow from about 8 to about 40, or from about 10 to about 35, or from about 15 to about 30 g/10 min. The amount of carboxylic acid reagent reacted with the polyolefin may range from about 0.5% to about 30% or from about 1% to about 20%, or from about 2% to about 15%, or from about 4% to about 10% by weight.

The alpha, beta unsaturated carboxylic reagent may be mono- or dicarboxylic acid reagent. The carboxylic reagents include carboxylic acids, esters and salts. The monobasic alpha, beta-unsaturated carboxylic acid reagents include acrylic, methacrylic, annamic, crotonic acids and esters, such as esters having from 1 to about 12 carbon atoms, and salts such as sodium, calcium or magnesium salts. Examples of dicarboxylic reagents include maleic acid, maleic anhydride, fumaric acid, mesaconic acid, himic anhydride, itaconic acid, citraconic acid, itaconic anhydride, citraconic anhydride, monomethyl maleate, monosodium maleate, etc. Particularly preferred alpha, beta-unsaturated carboxylic reagents are acrylic acid, methacrylic acid, acrylic esters, methacrylic esters and maleic anhydride.

The reaction between the carboxylic acid reagent and the olefin polymer or copolymer can be effected by means known to those skilled in the art. For example, the reaction can be conducted in solutions by a melt process in the presence of a free radical initiator. The free radical initiators usually are either peroxides or various organic azo compounds. The amount of initiator utilized generally from about 0.01% to about 5% by weight based on the combined weight of the polyolefin and the carboxylic reagent.

The reaction between the carboxylic acid reagent and the olefin polymer or copolymer is referred to as "grafting". For example, the present functionalized olefin polymers or copolymers are olefin polymers or copolymers grafted with acrylic acid, methacrylic acid, methyl acrylate, methyl methacrylate, 2-hydroxypropyl methacrylate, butyl acrylate or maleic anhydride. In the case of for example grafting with maleic anhydride, this is termed "maleated".

Examples of acrylated polyolefins are the POLYBOND polymers available from Uniroyal Chemical Company. A particularly useful polymer is POLYBOND 1002, which has a melt flow of 15-25 g/10 min and an acrylic acid content 5.5% to 7.0% by weight. An example of a commercially available maleic acid grafted polypropylene is Epolene E-43 wax from Eastman Chemical Products, Inc. Epolene E-43 has an acid number of 47 and an approximate number average molecular weight of 4500. Epolene C-16 and C-18 waxes are maleic acid grafted polyethylenes with approximate molecular weights of 8000 and 4000, respectively. Maleated ethylene-propylene elastomers also are useful, and such elastomers are available from Exxon Chemical Company under identification numbers 99-10, 99-14 and 99-26. These copolymers contain 77%, 64% and 43% of ethylene, respectively, and the maleated products contain 0.76%, 0.56% and 0.35% A of maleic acid or anhydride, respectively.

Other examples of commercially available maleic acid anhydride grafted polyolefins include Kraton FG1901X from Shell which is often referred to as a maleated selectively hydrogenated SEBS copolymer; terpolymers available from CdF Chimie under designations such as Lotader 3200 (prepared from a mixture of 88% by weight ethylene, 9% by weight butyl acrylate and 3% maleic anhydride), Lotader 6600 (70% ethylene, 27% acrylic ester and 3% maleic anhydride) etc.; ethylene vinyl acetate copolymers grafted with maleic anhydride (EVA-MAH) are available from Quantum Chemical Corp.

Alternatively, the functionalized olefin polymers or copolymers of component b) are the reaction products of an alpha-olefin with an alpha, beta-unsaturated carboxylic acid reagent as described above. The reaction is effected by means known in the art. For example, the reaction can be conducted by a melt process in the presence of a free radical initiator. The radical initiators are for example peroxides or organic azo compounds. Again, the unsaturated carboxylic reagents are for example acrylic acid, methacrylic acid, acrylic esters methacrylic esters or maleic anhydride.

For instance, the alpha-olefin is from $C_3$ up to about $C_{33}$, for example the alpha-olefin is a $C_{18}$-$C_{26}$ alpha-olefin, for example a $C_{22\text{-}26}$ or a $C_{18}$ alpha-olefin.

For instance, the functionalized olefin is a maleated alpha-olefin, that is, the reaction product of an alpha-olefin and maleic anhydride. For example the maleated alpha-olefin is of the formula

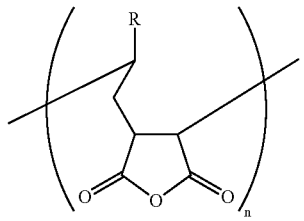

where
R is $C_{16}$ to $C_{24}$ alkyl and
n is an integer such that the average molecular weight is between about 20,000 and about 50,000.

The present functionalized olefin polymers or copolymers may be further reacted with a long chain alcohol or long chain amine as described in co-pending U.S. application Ser. No. 11/058,499, filed Feb. 15, 2005, the disclosure of which is hereby incorporated by reference.

That is, the functionalized olefin polymers or copolymers may be reacted with a long chain alcohol or long chain amine to form the ester or amide or imide products.

These additives are termed long chain esters, amides or imides of the functionalized olefin polymers or copolymers. The long chain esters, amides or imides likewise fall under the present definition of carboxylic acid reagent functionalized olefin polymers or copolymers.

The carbon chain of the long chain alcohol or long chain amine is straight or branched and may be saturated or unsaturated. The amine is primary or secondary.

For example, the present functionalized olefin polymers or copolymers may be further reacted to form an ester, partial ester, or half ester product resulting from reaction with a long chain alcohol, or to form an amide, partial amide or imide product resulting from reaction with a long chain primary or secondary amine. Imides may be prepared by heating a half amide. The present functionalized olefin polymers or copolymers may be further reacted to form mixtures of esters and amides.

Half ester or partial ester derivatives may be formed by dropwise addition of alcohol to a stirred, acid catalyzed solution of the functionalized olefin polymer or copolymer in an appropriate solvent under conditions such that water is not removed from the reaction mixture. Appropriate solvent is for example methyl isobutyl ketone. Suitable acid catalysts include sulfuric acid, methanesulfonic acid, and p-toluenesulfonic acid. Diesters are prepared using excess alcohol and removing the water to drive the reaction towards full esterification.

For instance, the present long chain esters are esters or half esters of maleated alpha-olefin of the formula

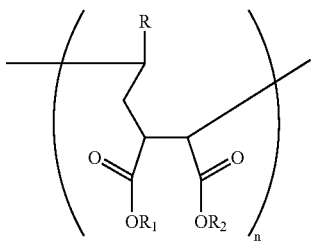

where
R is $C_{16}$ to $C_{24}$ alkyl,
$R_1$ and $R_2$ are independently hydrogen, $C_1$-$C_{22}$ alkyl or $C_2$-$C_{22}$ alkenyl
where at least one of $R_1$ and $R_2$ are $C_{12}$-$C_{22}$ alkyl or alkenyl and n is an integer such that the average molecular weight is between about 20,000 and about 50,000.

For instance, the present long chain amides are amides of maleated alpha-olefin of the formula

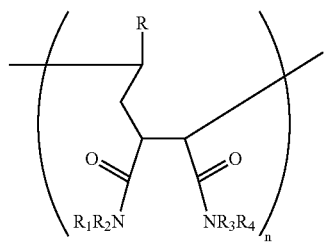

where
R is $C_{16}$ to $C_{24}$ alkyl,
$R_1$, $R_2$, $R_3$ and $R_4$ are independently hydrogen or $C_1$-$C_{22}$ alkyl or $C_2$-$C_{22}$ alkenyl,
where at least one of $R_1$, $R_2$, $R_3$ or $R_4$ are $C_{12}$-$C_{22}$ alkyl or alkenyl and
n is an integer such that the average molecular weight is between about 20,000 and about 50,000.

For instance, the present long chain imides are imides of maleated alpha-olefins of the formula

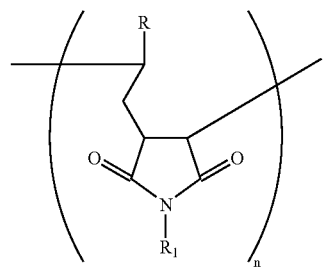

where
R is $C_{16}$ to $C_{24}$ alkyl,
$R_1$ is $C_{12}$-$C_{22}$ alkyl or alkenyl and n is an integer such that the average molecular weight is between about 20,000 and about 50,000.

For example R is $C_{16}$ or is $C_{20-24}$.

For instance, the present long chain esters of the functionalized olefin polymer or copolymer are half esters or esters with tallow fatty alcohol, ricinoleyl alcohol [CAS#540-11-4] or oleyl alcohol.

For example, the present long chain esters of the functionalized olefin polymer or copolymer are the half ester or ester reaction products of maleated olefin polymers or copolymers with the long chain alcohols.

For instance, the present long chain esters are the half ester or ester reaction products of maleated alpha-olefins with the long chain alcohols.

For instance, the present long chain amides are amide reaction products of maleated olefin polymers or copolymers or of maleated alpha-olefins with oleamide, erucamide, stearamide, behenamide, oleyl palmitamide, stearyl erucamide, ethylene-bis-stearamide or ethylene-bis-oleamide, or are the corresponding imides with oleamide, erucamide, stearamide or behenamide. That is, the amide or imide reaction products of maleated olefin polymers or copolymers or of maleated alpha-olefins with long chain amines.

For example, the present functionalized olefin polymer or copolymer is a long chain ester, long chain half ester, long chain amide, long chain partial amide or a long chain imide, which ester, half ester, amide, partial amide or imide is formed by the reaction of a long chain alcohol or long chain primary or secondary amine of the formulae $R_1OH$ or $R_1R_2NH$, where $R_1$ is $C_{12}$-$C_{22}$alkyl or $C_{12}$-$C_{22}$alkenyl and $R_2$ is hydrogen, $C_1$-C22alkyl or $C_2$-$C_{22}$alkenyl, with an olefin polymer or copolymer grafted with an alpha, beta-unsaturated carboxylic acid reagent or with a reaction product of an alpha-olefin with an alpha, beta-unsaturated carboxylic acid reagent.

Primary or Secondary Fatty Acid Amide

The primary or secondary fatty acid amides are for example where the fatty group of the fatty acids are $C_{11}$ to $C_{21}$ alkyl or alkenyl.

The primary or secondary fatty acid amide is for example at least one compound selected from the group consisting of oleamide, erucamide, stearamide, behenamide, oleyl palmitamide, stearyl erucamide, ethylene-bis-stearamide and ethylene-bis-oleamide.

In particular, the present fatty acid amides are secondary fatty acid amides, for example stearyl erucamide or oleyl palmitamide.

Suitable fatty acid amides are for example disclosed in U.S. Pat. No. 6,228,915, the relevant disclosures of which are hereby incorporated by reference.

Alkyl is straight or branched chain and is for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

Alkenyl is ethylenically unsaturated alkyl, for example allyl.

The weight:weight ratio of the functionalized olefin polymer or copolymer additive to the primary or secondary fatty acid amide additive is for example between about 20:1 and about 1:20, between about 10:1 and 1:10, between about 1:1 and about 20:1, for example between about 1:1 and about 15:1, between about 1:1 and about 10:1, between about 1:1 and about 7:1, or between about 1:1 and about 5:1. For instance, the weight:weight ration of the functionalized maleated alpha-olefin to the primary or secondary fatty acid amide is about 1.5:1, about 2:1, about 3:1, or about 4:1.

The total of the functionalized olefin polymer or copolymer b) and primary or secondary fatty acid amide additive c) combination to be incorporated into the polymer substrate is for example between about 1% and about 15% by weight, based on the weight of the polymer substrate. For example, the additive combination is present from about 1% to about 10%, from about 3% to about 7%, or from about 3% to about 5% by weight, based on the weight of the polymer substrate. For instance, the present additive combination is present from about 1% to about 3%, from about 1% to about 5%, or from about 1% to about 7% by weight, based on the weight of the polymer substrate.

The additives of the invention may be added to the polymer substrate individually or mixed with one another. If desired, the individual components can be mixed with one another before incorporation into the polymer for example by dry blending, compaction or in the melt.

The incorporation of the additives of the invention is carried out by known methods such as dry blending in the form of a powder, or wet mixing in the form of solutions, dispersions or suspensions for example in an inert solvent, water or oil. The additives of the invention may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additives to the polymer substrate can be carried out in all customary mixing machines in which the polymer is melted and mixed with the additives. Suitable machines are known to those skilled in the art. They are predominantly mixers, kneaders and extruders.

Processing includes extrusion, co-kneading, pultrusion, compression molding, sheet extrusion, thermoforming, injection molding or rotational molding. The process is preferably carried out in an extruder by introducing the additives during processing.

Particularly preferred processing machines are single-screw extruders, contrarotating and corotating twin-screw extruders, rotomolding devices, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion*, Vol. 1 Grundlagen, Editors F. Hensen, W Knappe, H. Potente, 1989, pp. 3-7, ISBN:3-446-14339-4 (*Vol. 2 Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The additives of the invention can also be sprayed onto the polymer material. They are able to dilute other additives (for example optional conventional additives) or their melts so that they can be sprayed also together with these additives onto the material. Addition by spraying during the deactivation of the polymerization catalysts is particularly advantageous; in this case, the steam evolved may be used for deactivation of the catalyst.

The additives of the invention and optional further additives can also be added to the polymer in the form of a masterbatch ("concentrate") which contains the components in a concentration of, for example, about 1% to about 40% and preferably about 2% to about 20% by weight incorporated in a polymer. The polymer must not necessarily be identical to the polymer where the additives are added finally. In such operations, the polymer can be used in the form of powder, granules, solutions, suspensions or in the form of latices.

Incorporation can take place prior to or during the shaping operation, or by applying the dissolved or dispersed compound to the polymer, with or without subsequent evaporation of the solvent. A further possibility for incorporating the additives of the invention into polymer substrates is to add them before, during or directly after the polymerization of the corresponding monomers or prior to crosslinking. In this context the additives of the invention can be added as it is or else in encapsulated form (for example in waxes, oils or polymers).

The polymers containing the additives of the invention described herein can be used for the production of moldings, rotomolded articles, injection molded articles, blow molded articles, profiles, and the like.

The polymers of the present invention may optionally also contain from about 0.01 to about 5%, preferably from about 0.025 to about 2%, and especially from about 0.1 to about 1% by weight of various conventional additives, such as the materials listed below, or mixtures thereof.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl) butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis-(2,2,6,6-tetramethylpiperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvore PR31, di-(1,2,2,6,6-pentamethylpiperidin-4-yl) p-methoxybenzylidenemalonate (CAS #147783-69-5).

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis (1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6, 6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in U.S. Pat. No. 5,980,783, the relevant parts of which are hereby incorporated by reference, that is compounds of component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on columns 64-72 of said U.S. Pat. No. 5,980,783.

The sterically hindered amine may also be one of the compounds described in U.S. Pat. Nos. 6,046,304 and 6,297,299, the disclosures of which are hereby incorporated by reference, for example compounds as described in claims 10 or 38 or in Examples 1-12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethylpiperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethyl-amino)-s-triazine.

2.8. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.9. Tris-aryl-o-hydroxyphenyl-s-triazines, for example known commercial tris-aryl-o-hydroxyphenyl-s-triazines and triazines as disclosed in, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethyl-phenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3 positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl)methyl phosphite, bis(2,4-di-tert-butyl-6-methylphenyl)ethyl phosphite, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl)phosphite (Irgafos® 168, Ciba Specialty Chemicals Corp.), tris(nonylphenyl)phosphite,

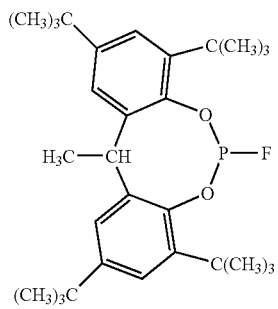
(A)

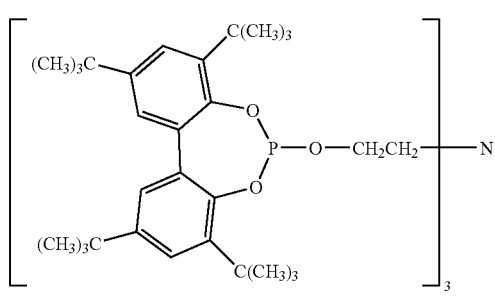
(B)

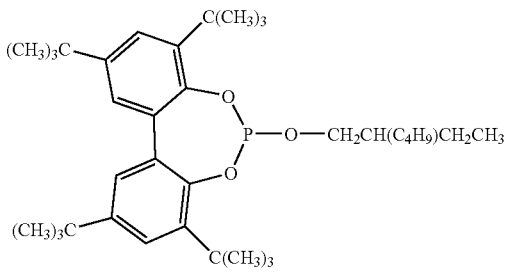
(C)

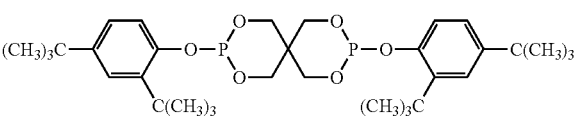
(D)

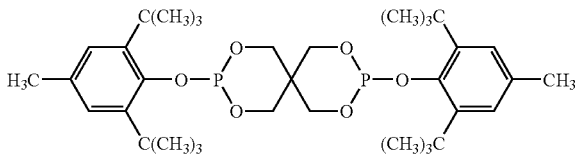
(E)

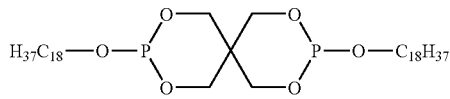
(F)

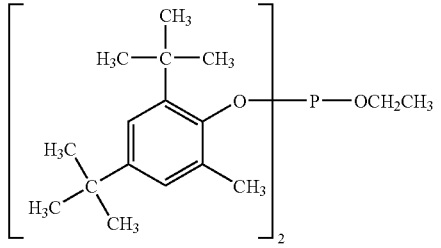
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N-methyl-N-octadecylhydroxylamine and the N,N-dialkylhydroxylamine derived from hydrogenated tallow amine.

6. Nitrones, for example N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone and the nitrone derived from N,N-dialkylhydroxylamine derived from hydrogenated tallow amine.

7. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Benzofuranones and indolinones, for example those disclosed in U.S. Pat. Nos. 4,325,863, 4,338,244, 5,175,312, 5,216,052, 5,252,643 5,369,159 5,356,966 5,367,008 5,428,177 or 5,428,162 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl -3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2-acetyl-5-isooctylphenyl)-5-isooctylbenzofuran-2-one and 3-(2,3-dimethylphenyl)-5,7-di-tert-butyl-benzofuran-2-one.

9. Thiosynergists, for example dilauryl thiodipropionate or distearyl thiodipropionate.

10. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

11. Polyamide stabilizers, for example copper salts in combination with iodides and/or phosphorus compounds and salts of divalent manganese.

12. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

14. Fillers and reinforcing agents, for example calcium carbonate, silicates, glass fibers, glass bulbs, asbestos, talc, kaolin, mica, barium sulfate, metal oxides and hydroxides, carbon black, graphite, wood flour and flours or fibers of other natural products, synthetic fibers.

15. Dispersing Agents, such as polyethylene oxide waxes or mineral oil.

16. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers such as substituted and unsubstituted bis-benzylidene sorbitols, benzoxazinone UV absorbers such as 2,2'-p-phenylene-bis(3,1-benzoxazin-4-one), Cyasorb® 3638 (CAS#18600-59-4), and blowing agents.

Nano-scaled fillers, or nanocomposites, may also be employed in the present compositions. Included are "nanoclays", disclosed for example in U.S. Pat. Nos. 5,853,886 and 6,020,419, the relevant disclosures of which are hereby incorporated by reference.

Nano-scaled fillers are for example phyllosilicates or smectite clays, for example organophilic phyllosilicates, naturally occuring phyllosilicates, synthetic phyllosilicates or a mixture of such phyllosilicates. The present nano-scaled fillers are for example montmorillonites, bentonites, beidellites, hectorites, saponites or stevensites.

For example, nano-scaled montmorillonites have a "platey" or platelet structure. The platelets generally have a thickness below about 2 nm. The platelets or particles generally have an average diameter between about 20 and about 30,000 nm, and a ratio of length to width of between about 30,000:1 and 20:1. Commercially available nano-scaled montmorillonites of such structure are Nanomer® 1.42E, available from Nanocor, and Cloisite® 30B, available from Southern Clay.

Nano-scaled fillers possess an extremely large surface with high surface energy. The deactivation of the surface energy and the compatibilization of the nano-scaled fillers with a polymer is therefore even more important than with a common micro-scaled filler in order to avoid coagulation and reach an excellent dispersion of the nano-scaled filled in the polymer. The nano-scaled fillers like the phyllosilicates are made organophilic by ion exchange, for example with alkylammonium salts. Such nano-scaled organophilic phyllosilicates are better swellable and easier to disperse in a polymer matrix.

Treated nano-scaled fillers are also referred to as "treated layered clay material" or "organoclay".

The nano-scaled filler is present in the compositions of the present invention at a concentration of about 0.5 to about 10% by weight, based on the weight of the polymer, for example, about 1 to about 9% by weight, for instance about 3 to about 7% by weight, for example about 5% by weight, based on the weight of the polymer.

The present polymer compositions exhibit good weatherability (stability towards heat, oxygen and light), scratch resistance, good processability, good mechanical strength, good gloss retention, and are non-sticky. The polymer molded parts are suitable for example for automotive applications, i.e. bumper fascia and the like.

The present polymer compositions may also be for example in the form of sheets, part of multilayer structures, wire or cable insulation, films or natural products composites.

The following Examples illustrate the invention in more detail. Unless otherwise indicated, all percentages are in parts by weight.

EXPERIMENTAL

Example 1

The present functionalized olefin polymers b) are:

b1) polymer of $C_{22}$-$C_{26}$ alpha-olefin with maleic anhydride, b2) tallow fatty alcohol ester of the polymer of $C_{22}$-$C_{26}$ alpha-olefin with maleic anhydride:

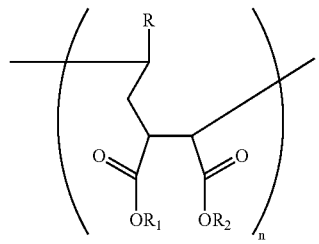

where $R_1$ and $R_2$ are tallow, R is $C_{20}$-$C_{24}$ alkyl and n is an average value of about 45, b3) maleic acid grafted polypropylene or b4) tallow fatty alcohol ester of the maleic acid grafted polypropylene.

The present fatty acid amides of component c) are:

c1) stearyl erucamide or c2) oleyl palmitamide.

A 2:1 weight:weight blend of the carboxylic acid reagent functionalized olefin polymer b) to the primary or secondary fatty acid amide c) is prepared. Likewise, 1:1 weight:weight blends and 1:2 weight:weight blends are prepared.

The components b) and c) are present at weight levels, in total, of 3%, based on the weight of the polymer substrate.

The polymer substrates tested are PC/ABS, nylon 6, nylon 6,6, PC, PVC, PET, ABS, PBT, ABS/PBT and ABS/PC.

Other additives evaluated for comparative performance are oleamide, stearyl erucamide and Dow Corning MB 50-321 polysiloxane additive. Weight percents are on the polymer. The additives are compounded in the polymer substrate. All compounding is done using 25 mm twin-screw extruder using industry standard conditions. Injection molded plaques are made from the compounded samples using BOY 50-M injection molding machine using standard conditions.

Several tests are performed to evaluate scratch resistance before and after weathering, in addition to impact properties.

Standard Five Finger Scratch test guidelines (Daimler Chrysler Corporation Test Number LP-463DD-18-1, dated Jul. 24, 2002)

| Rating | Scratch Width | Whitening |
|---|---|---|
| 1 (best) | <0.2 mm wide, almost invisible | none |
| 2 | 0.2-0.3 mm wide, slight deformation, visible at close range | none |
| 3 | 0.3-0.4 mm wide, clearly visible | |
| 4 | 0.4-0.5 mm wide | visible whitening over entire scratch |
| 5 (worst) | >0.5 mm wide | white over entire scratch and possibly accompanied by debris |

The present inventive blends provide for excellent scratch resistance and are non-sticky.

Results After Weathering

In a separate detailed study, results are shown after weathering. Xenon arc WeatherOmeter at 0.55 W/m² irradiance (340 nm), SAE J 1885—NAFTA interior automotive protocol, 89° C. black panel temperature, dry conditions. Scratch resistance to 600 kJ/m² is desirable. Standard five-finger test ratings are measured.

After 600 KJS weathering, the present inventive blends exhibit outstanding scratch resistance.

Plaques containing stearyl erucamide alone become sticky after exposure to 600KJS. The inventive blend gives a surprising synergistic effect without any adverse effect upon weathering. That is, the inventive blends provide for excellent scratch resistance and weathering stability, and are non-sticky.

Modified Taber Abrasion Test

Visual Inspection Guidelines

| Rating | Scratch Width | Relative Performance |
|---|---|---|
| 1 (best) | <50 mm | excellent |
| 2 | 200-300 mm | good |
| 3 | 300-400 mm | fair |
| 4 | 400-500 mm | poor |
| 5 (worst) | >500 mm | very poor |

The present inventive blends provide for excellent abrasion resistance according to the Taber Abrasion Test.

The present inventive additive blends provide for excellent impact strength according to the Notched Izod Impact test.

Example 2

Multilayer Polymer Structures

The present components b) and c) have utility as anti-scratch additives in polymer layers present in multilayer polymer structures. Examples of such polymer structures include but are not limited to:

1.) Sheets and signs as seen in U.S. Pat. Nos. 6,150,440 and 5,387,458, the disclosures of which are incorporated herein by reference;

2.) Solar Control Films of Various Construction as seen in U.S. Pat. Nos. 3,290,203, 3,681,179, 3,776,805 and 4,095,013, incorporated herein by reference; and 3.) Base stock or cap stock for coextrusion structures such as window profiles, laminates over automotive bumpers or auto exterior panels.

A multilayer polymer composite is prepared by different routes, such as co-extrusion of one or more polymer compositions to form the multilayer composite. Alternatively, compression molding or thermoforming of polymer compositions produces the desired polymer composite. In particular, these techniques are used in the manufacture of signage, typically composed of one or more layers of polymeric materials formed on top of a base material (metal sheet, plastic, etc).

What is claimed is:

1. A polymer composition comprising
   a) a polyamide substrate and
   an amount effective to improve the scratch resistance and light stability of said polyamide substrate of an additive combination of
   b) a carboxylic acid reagent functionalized olefin polymer or copolymer and
   c) a primary or secondary fatty acid amide,
   where the functionalized olefin polymer or copolymer is a long chain ester, long chain half ester, long chain amide, long chain partial amide or long chain imide,
   which ester, half ester, amide, partial amide or imide is formed by the reaction of a long chain alcohol or long chain primary or secondary amine of the formulae $R_1OH$ or $R_1R_2NH$, where $R_1$ is $C_{12}$-$C_{22}$alkyl or $C_{12}$-$C_{22}$alkenyl and $R_2$ is hydrogen, $C_1$-$C_{22}$alkyl or $C_2$-$C_{22}$alkenyl,
   with an olefin polymer or copolymer grafted with an alpha, beta-unsaturated carboxylic acid reagent or
   with a reaction product of an alpha-olefin with an alpha, beta-unsaturated carboxylic acid reagent.

2. A composition according to claim 1 where the functionalized olefin polymer or copolymer is the half ester or ester of maleated polypropylene, maleated polyethylene or maleated $C_{18}$-$C_{26}$ alpha-olefin with tallow fatty alcohol, ricinoleyl alcohol or oleyl alcohol.

3. A composition according to claim 1 where the fatty acid amide is stearyl erucamide or oleyl palmitamide.

4. A composition according to claim 1 where the weight: weight ratio of the functionalized olefin polymer or copolymer to the primary or secondary fatty acid amide is between about 1:1 and about 20:1.

5. A composition according to claim 1 where the weight: weight ratio of the functionalized olefin polymer or copolymer to the primary or secondary fatty acid amide is between about 1:1 and about 5:1.

6. A composition according to claim 1 where the total of the functionalized olefin polymer or copolymer and the primary or secondary fatty acid amide additive combination is between about 1% and about 10% by weight, based on the weight of the polyamide substrate.

7. A composition according to claim 1 where the total of the functionalized olefin polymer or copolymer and the primary or secondary fatty acid amide additive combination is between about 1% and about 5% by weight, based on the weight of the polyamide substrate.

8. A composition according to claim 1 further comprising one or more additives selected from the group consisting of the hydroxylamine stabilizers, the organic phosphorus stabilizers, the benzofuranone stabilizers, the hindered amine light stabilizers and the hydroxyphenylbenzotriazole, hydroxyphenyl-s-triazine or benzophenone ultraviolet light absorbers.

9. A method for providing scratch resistance to a polyamide substrate, which method comprises incorporating into said polyamide
an effective amount of an additive combination of
b) a carboxylic acid reagent functionalized olefin polymer or copolymer and
c) a primary or secondary fatty acid amide,
where the functionalized olefin polymer or copolymer is a long chain ester, long chain half ester, long chain amide, long chain partial amide or long chain imide,
which ester, half ester, amide, partial amide or imide is formed by the reaction of a long chain alcohol or long chain primary or secondary amine of the formulae
$R_1OH$ or $R_1R_2NH$, where $R_1$ is $C_{12}$-$C_{22}$alkyl or $C_{12}$-$C_{22}$alkenyl and $R_2$ is hydrogen, $C_1$-$C_{22}$alkyl or $C_{12}$-$C_{22}$alkenyl,
with an olefin polymer or copolymer grafted with an alpha, beta-unsaturated carboxylic acid reagent or
with a reaction product of an alpha-olefin with an alpha, beta-unsaturated carboxylic acid reagent.

* * * * *